Dec. 8, 1959  E. M. ESTES ET AL  2,916,325
SEATING ARRANGEMENT FOR VEHICLE BODIES
Filed Jan. 7, 1957
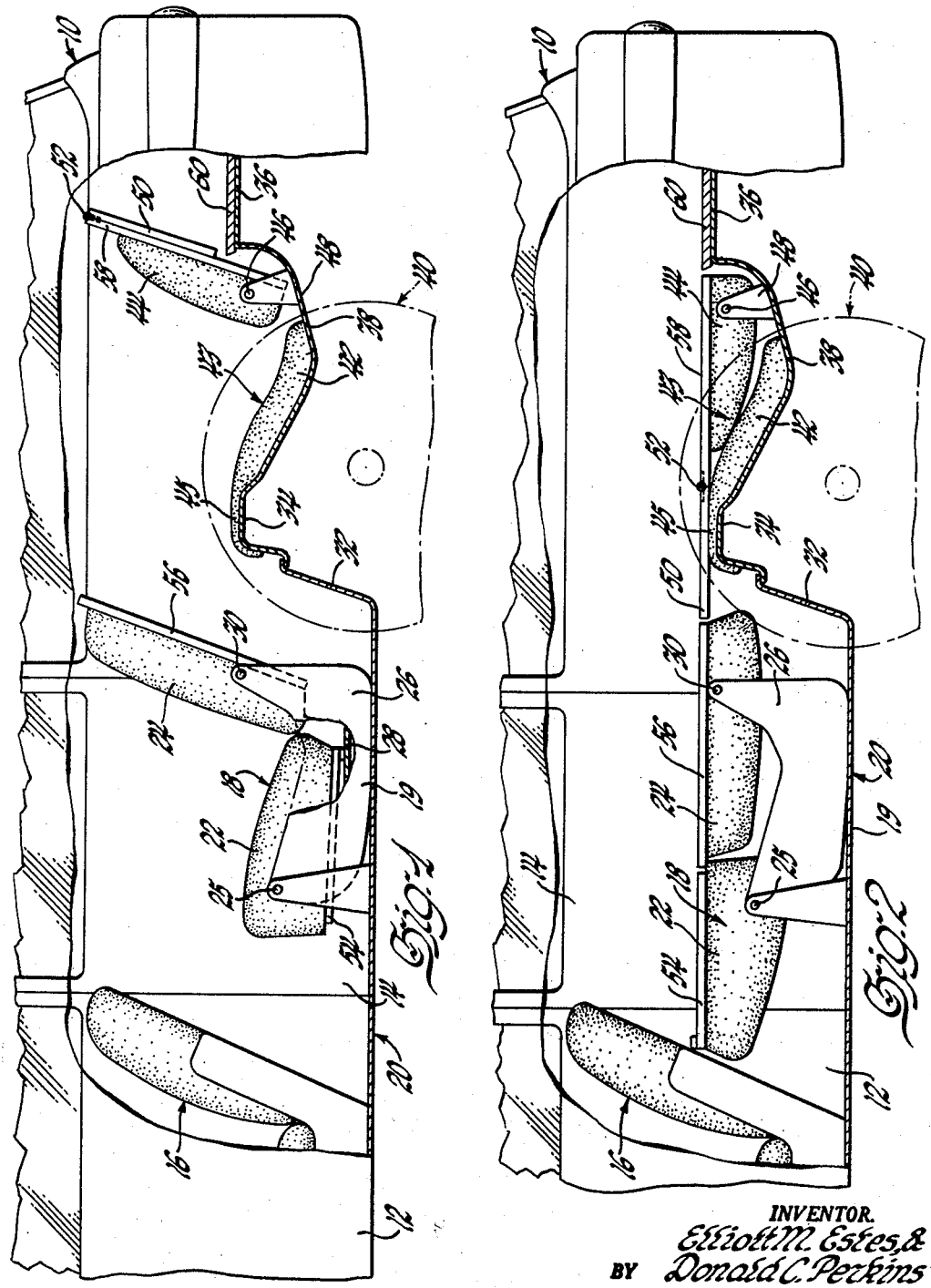
INVENTOR.
Elliott M. Estes &
BY Donald C. Perkins
W. S. Pettigrew
ATTORNEY

United States Patent Office 2,916,325
Patented Dec. 8, 1959

2,916,325
SEATING ARRANGEMENT FOR VEHICLE BODIES

Elliott M. Estes, East Lansing, and Donald C. Perkins, Lansing, Mich., assignors to General Motors Corporation, Detroit, Mich., a corporation of Delaware Application January 7, 1957, Serial No. 632,815
5 Claims. (Cl. 296—66)

This invention relates to seating arrangements for vehicle bodies and more particularly to foldable seating arrangements for vehicle bodies.

The seating arrangement of this invention is intended primarily for use in multi-purpose vehicle bodies such as station wagon bodies. The seating arrangement for station wagon bodies usually includes a front or driver's seat and a second passenger seat disposed rearwardly of the driver's seat and foldable between a normal upright position and a folded position when the body is converted for load carrying purposes. When the second seat is in folded position, the seat is disposed substantially flush with the rear portion of the vehicle body floor pan which is usually located above the forward portion of the floor pan in order to provide clearance for the rear wheel and axial structure of the body. In the past, third seats have often been mounted on the rear portion of the floor pan, but these seats had to be bodily removed when the station wagon body was converted for load carrying purposes.

The seating arrangement of this invention includes the front seat and second passenger seat and further includes a third seat which may be used for passenger carrying purposes and which is easily foldable between a normal position and a folded position wherein the entire third seat is located flush with the rear portion of the vehicle body floor pan and also with the second seat in the folded position thereof to provide an uninterrupted load carrying deck from the driver's or front seat to the rear door opening of the station wagon body. By providing such a third seat in combination with the second seat arrangement, the station wagon body may be used for maximum capacity passenger carrying purposes and may be easily converted for maximum capacity load carrying purposes without removal of any of the seats from the body and with a minimum expenditure of time and effort.

The primary object of this invention is to provide an improved seating arrangement for multi-purpose vehicle bodies. Another object of this invention is to provide an improved seating arrangement for multi-purpose vehicle bodies which includes a number of seats foldable between a normal position and a folded position substantially flush with the floor of the body to provide an increased load carrying capacity for the body. A further object of this invention is to provide an improved foldable third seat arrangement for station wagon bodies which is foldable between a normal position and a stored position wherein the seat is located substantially flush with the floor of the body and with a foldable second seat in the folded position thereof.

These and other objects of this invention will be readily apparent from the following specification and drawing, in which:

Figure 1 is a partial side elevational view of a station wagon body of the type including a driver's seat, a second passenger seat and a third passenger seat according to this invention, with the second and third seats being located in a normal upright position; and Figure 2 is a view similar to Figure 1 but showing the second and third seats in their stored position when the body is converted for load carrying purposes.

Referring now to Figure 1 of the drawings, a station wagon body 10 includes a front door 12 and a rear door 14 which are movable between closed position, as shown, and open position to provide access to and exit from the driver's or front seat 16 and the second passenger seat 18. The driver's seat 16 is a common type of full seat which spans the body transversely thereof and may be adjustable either horizontally or vertically. The seat 16 is supported in a known manner on the forward section 19 of the floor pan 20 of the body which defines the lower wall of the interior passenger compartment.

The second passenger seat 18 includes a seat bottom 22 and a seat back 24. The seat bottom 22 is pivoted at 25 adjacent its forward edge on either side thereof to a bracket 26 for swinging movement about a substantially horizontal axis. The brackets 26 are secured to the forward section 19 of the vehicle floor pan 20 and includes a stop 28 so as to support the rear end of the seat bottom 22 in its normal position thereof as shown in Figure 1. As is known, the second seat of station wagon bodies may either be a full seat which spans the body transversely thereof, or may be a split seat wherein the seat bottom and seat back are divided into two separate seats with each seat being independently foldable of the other. If the second seat is of the full seat type, then a bracket 26 will be provided on either side of the body. However, if the seat is of the split seat type, then intermediate brackets 26 will be provided so as to independently provide for swinging movement of each of the seat bottoms 22 of the seats.

The seat back 24 is pivoted at 30 adjacent its lower end on each side thereof to the brackets 26 for swinging movement about a substantially horizontal axis. As has been previously explained, the seat back 24 may be split into two or more sections with these sections being co-extensive with the sections of the split seat bottom.

Adjacent and rearwardly of the second seat 18, the floor pan 20 includes an upwardly extending offset section 32 which is joined to an upper section 34. A section 36 of the floor pan spaced rearwardly of section 34 is located slightly above the latter, with these sections being interconnected by an intermediate well 38. The section 36 extends to the rear of the body, which is usually opened and closed by suitable closure members to provide access. The floor pan sections 34 and 36, and well 38 are located above the floor pan section 19 in order to provide clearance room for the rear wheel and axle structure of the body which is indicated schematically at 40.

A third seat 43 includes a seat bottom 42 of resilient material which is secured to the lower wall of well 38 in a suitable manner and includes a portion 45 extending outwardly of the well over the floor pan section 34. It will be noted that the contour of the lower wall of well 38 and seat bottom 42 is such as to approximate the contour of the legs of a passenger when seated in order to provide for his comfort. A third seat back 44 is pivoted at 46 on either side thereof to a bracket 48 which is fixed in a suitable manner to the lower wall of well 38 adjacent the rear end thereof, with the pivots 46 defining a substantially horizontal axis of swinging movement of the seat back 44. A platform 50 is hinged to the third seat back at 52 and normally lies substantially flush with the seat back when the seat back is in its normal position, as can be seen in Figure 1.

When the second seat 18 and the third seat 43 are in their normal positions, as shown in Figure 1, the seats may be occupied by passengers so that the station wagon body may be used for passenger carrying purposes. These bodies are of the multi-purpose type in that the bodies are convertible from passenger carrying use to load carrying use. This feature of such bodies adds to their usefulness and has resulted in an increased public acceptance of this type of body in recent years.

When it is desired to convert the body for load carrying use, the second seat bottom 22 is swung forwardly about its pivots 24 until the lower wall of the seat bottom faces upwardly. A deck portion 54 secured to the lower wall of seat bottom 22 provides a portion of the load bearing deck as will be described. Similarly, the seat back 24 of the second seat is also swung forwardly about its pivots 30 until the rear wall of the seat faces upwardly to position a deck portion 56 on the seat back substantially flush with the deck portion 54 on the lower wall of the seat bottom 22.

The third seat back 44 is then swung forwardly about its pivots 46 until the seat back is disposed within the well 38 of the floor in engagement with the seat bottom 42, with the deck portion 58 on the rear wall of the seat back being positioned substantially flush with the deck portion 60 on the floor pan section 36 and providing a load bearing floor portion. In order to bridge the space between the forward end of deck portion 58 and the rearward end of deck portion 56, the platform member 50 is swung forwardly about its pivots 52 and into engagement with the portion 45 of the third seat bottom which is located over the floor pan section 34. Thus, when the second and third seats have been moved from their position of Figure 1 to their position of Figure 2, a continuous uninterrupted load bearing deck is provided from the driver's set to the rear of the station wagon body with this deck being made up successively of portions 54 and 56, platform member 50, and portions 58 and 60.

When it is desired to convert the station wagon body for passenger carrying use, the second seat bottom and seat back 22 and 24, respectively, are swung upwardly and rearwardly about their respective pivots 24 and 30 and the third seat back 44 is swung upwardly and rearwardly about its pivots 46 after the platform member 50 has been folded over the rear wall of the seat back.

Thus, this invention provides an improved seat arrangement for multi-purpose vehicle bodies which allows these bodies to be easily and quickly converted for either load bearing or passenger carrying purposes. The improved third seat of this invention need not be bodily removed from the body when it is converted for load carrying purposes and may be easily and quickly stored within the body to not only move the seat to an out-of-the-way position, but to also provide a portion of the load bearing deck of the body.

We claim:

1. A seat arrangement for vehicle bodies of the type including a floor having an elevated floor section provided with a well therein comprising, a seat bottom mounted within said well and located below the level of said floor section, a seat back pivotally supported within said well for movement between an upright position wherein said seat back and bottom provide a passenger carrying seat and a folded position wherein said seat back is disposed within said well above said seat bottom to provide a partial continuation of said floor section over said well, and means on said seat back movable relative thereto when said seat back is disposed within said well to provide a further continuation of said floor section over said well.

2. A seat arrangement for vehicle bodies of the type including a floor having an elevated floor section provided with a well therein comprising, a seat bottom mounted within said well and located below the level of said floor section, a seat back pivotally supported within said well for movement between an upright position wherein said seat back and bottom provide a passenger carrying seat and a folded position wherein said seat back is disposed within said well above said seat bottom to provide a partial continuation of said floor section over said well, and a platform member swingably mounted on said seat back for movement therewith between said upright position and said folded position, said platform member being swingable to one side of said seat back when said seat back is in said folded position thereof to provide a further continuation of said floor section over said well and thereby close said well with said seat back.

3. A seat arrangement for vehicle bodies including a floor having a lower portion and an upper portion joined by an intermediate portion wherein said upper portion is provided with a well therein comprising, a first seat mounted on said floor adjacent the forward end of said body, a second seat disposed rearwardly of said first seat and foldable between an upright position wherein said seat may be used for passenger carrying purposes and a stored position wherein said seat provides a spaced continuation of said upper floor portion, a third seat including a seat bottom mounted within said well of said upper floor portion and a seat back pivotally supported within said well for movement between an upright position wherein said seat back and bottom provide a passenger carrying seat and a folded position wherein said seat back is disposed within said well above said seat bottom to provide a continuation of said upper floor portion over said well, and means on said seat back foldable relative thereto when said seat back is disposed within said well to provide a continuation of said seat back to thereby close the space between said seat back and said second seat when said second and third seats are in folded position.

4. A seating arrangement for vehicle bodies of the type including a floor having an elevated floor section with a well therein comprising, a seat bottom mounted within said well and disposed below the adjacent level of said floor section, a seat back, a floor panel mounted on the rear of said seat back, means pivotally supporting said seat back within said well for movement between an upright position wherein said seat back and bottom provide a passenger carrying seat and a folded position wherein said seat back is disposed over said seat bottom within said well with said floor panel being located substantially level with said floor section to provide a partial continuation thereof over said well, and a second floor panel section swingably secured to said first panel section and swingable relative thereto when said seat bottom is within said well to provide a further continuation of said floor section over said well to thereby close said well.

5. A seating arrangement for vehicle bodies of the type including a floor having a lower floor section and an upper floor section joined by an intermediate wall wherein said upper floor section is provided with a well therein comprising, a first seat mounted on said lower floor section adjacent the forward end of said body, a second seat including a seat bottom and a seat back mounted on said lower floor section rearwardly of said first seat and foldable between an upright position wherein said seat may be used for passenger carrying purposes and a folded position wherein said seat bottom and seat back are disposed in aligned relationship between said wall and said first seat to provide a spaced continuation of said upper floor section, a third seat including a seat bottom mounted within said well and a seat back pivotally supported within said well for movement between an upright position wherein said seat back and bottom provide a passenger carrying seat and a folded position wherein said seat back is disposed within said well above said seat bottom to provide a partial continuation of said upper floor section over said well, and a floor panel section swingably mounted on said seat back and swingable forwardly thereof when said seat back is in folded position to provide a further continuation of said upper floor section over said well to said second seat back.

References Cited in the file of this patent
UNITED STATES PATENTS

| | | |
|---|---|---|
| 1,067,008 | Draper | July 8, 1913 |
| 2,502,061 | Radford | Mar. 28, 1950 |
| 2,677,574 | Golubics | May 4, 1954 |

FOREIGN PATENTS

| | | |
|---|---|---|
| 106,977 | Australia | Mar. 30, 1939 |
| 881,601 | France | Jan. 28, 1943 |